United States Patent
Prasad et al.

(10) Patent No.: US 10,239,326 B2
(45) Date of Patent: Mar. 26, 2019

(54) PRE-TREATMENT FIXING FLUID FOR AN OFFSET COATED MEDIUM

(71) Applicant: Hewlett-Packard Development Company, L.P., Houston, TX (US)

(72) Inventors: Keshava A. Prasad, San Marcos, CA (US); Ali Emamjomeh, San Diego, CA (US); George Sarkisian, San Diego, CA (US); Fereshteh Khorrami, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 303 days.

(21) Appl. No.: 15/105,556

(22) PCT Filed: Jan. 28, 2014

(86) PCT No.: PCT/US2014/013346
§ 371 (c)(1),
(2) Date: Jun. 16, 2016

(87) PCT Pub. No.: WO2015/116030
PCT Pub. Date: Aug. 6, 2015

(65) Prior Publication Data
US 2016/0319146 A1 Nov. 3, 2016

(51) Int. Cl.
*B41J 2/01* (2006.01)
*B41J 11/00* (2006.01)
*B41J 2/21* (2006.01)
*C09D 1/00* (2006.01)
*B41M 5/00* (2006.01)
*C09D 11/54* (2014.01)

(52) U.S. Cl.
CPC .............. *B41J 2/2114* (2013.01); *B41J 2/01* (2013.01); *B41J 11/0015* (2013.01); *B41M 5/0017* (2013.01); *C09D 1/00* (2013.01); *C09D 11/54* (2013.01)

(58) Field of Classification Search
CPC ......... C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | | |
|---|---|---|---|
| 5,500,668 A | 3/1996 | Malhotra et al. | |
| 8,556,402 B2 | 10/2013 | Li | |
| 2005/0003112 A1 | 1/2005 | Chen | |
| 2009/0295893 A1 | 12/2009 | Akiyama et al. | |
| 2010/0112245 A1 | 5/2010 | Nakano | |
| 2013/0141500 A1* | 6/2013 | Prasad | B41J 2/2114 347/87 |
| 2014/0055520 A1* | 2/2014 | Inumaru | C09D 11/40 347/21 |

FOREIGN PATENT DOCUMENTS

| | | |
|---|---|---|
| EP | 2660066 | 11/2013 |
| JP | 2003159871 | 6/2003 |
| JP | 2008265060 | 11/2008 |
| WO | WO-2011099977 | 8/2011 |
| WO | WO2012090477 | 7/2012 |
| WO | WO2013141246 | 9/2013 |

OTHER PUBLICATIONS

International Search Report and Written Opinion for International Application No. PCT/US2014/013346 dated Oct. 27, 2014, 9 pages.

* cited by examiner

*Primary Examiner* — Manish S Shah
(74) *Attorney, Agent, or Firm* — Dierker & Kavanaugh PC

(57) ABSTRACT

An example of a pre-treatment fixing fluid for an offset coated medium includes calcium propionate, calcium pantothenate, tetraethylene glycol, a surfactant having an HLB less than 10, an acid, and a balance of water. The calcium propionate is present in an amount ranging from greater than 4.5 wt % to 8.0 wt %, the calcium pantothenate is present in an amount ranging from about 2.0 wt % to equal to or less than 15 wt %, and the surfactant is present in an amount ranging from about 0.01 wt % to about 1.0 wt %, each based on the total wt % of the pre-treatment fixing fluid. The acid is present in an amount sufficient to render the pH from about 4.0 to about 7.0.

13 Claims, No Drawings

PRE-TREATMENT FIXING FLUID FOR AN OFFSET COATED MEDIUM

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

DETAILED DESCRIPTION

In various types of inkjet printing, pre-treatment compositions have been applied on the print recording medium before the application of an ink composition in view of improving printing characteristics and attributes of the image. Pre-treatment compositions are often substantially colorless liquids that interact with the colorant and/or with polymeric components of the ink composition in order to precipitate the colorants or otherwise fix the ink composition to the print media surface. The precipitated colorants tend to deposit on the surface of the recording medium, which contributes to the enhancement of image quality attributes, such as, for example, good optical density.

In theory, pre-treatment compositions may be particularly desirable for use on coated offset media, which is a slow-absorbing media with high hold-out (i.e., colorants tend to remain on the surface of the media). Some pre-treatment compositions have been applied to coated offset media and dried prior to subsequent ink application. This forms a dried ink-receiving type of layer on the surface of the medium. While this desirably controls bleed, the gloss of the resulting print often suffers.

For high speed inkjet printing, wet-on-wet printing (i.e., wet ink deposited on wet pre-treatment fluid) may be desirable, for example, so that in-line printing can be performed. Wet-on-wet printing could also enable the use of commercially available coated offset media which does not include any pre-treatment composition thereon, and thus may otherwise be undesirable for high speed inkjet printing. The chemistry involved in wet-on-wet printing is complex, due in part to the interaction between the media and the pre-treatment composition, and between the pre-treatment composition and the ink(s). In addition, for wet-on-wet printing, the slow-absorbing nature of coated offset media requires the pre-treatment composition to be highly (i.e., immediately) reactive with subsequently deposited inks in order to control bleed and pigment floatation (i.e., dot gain). The desired reactivity may be accomplished by increasing the organic acid salt content; however, it has been found that a higher salt content can lead to pen reliability issues resulting from corrosion, and to the formation of prints with poor durability.

The present inventors have discovered a pre-treatment fixing fluid that is suitable for wet-on-wet printing on coated offset media. The pre-treatment fixing fluid includes a particular combination of salts (at a desirably low content), a particular co-solvent, and a low HLB (hydrophilic-lipophilic balance) surfactant that is capable of dynamically lowering the surface tension of the pre-treatment fluid. In the examples disclosed herein, the HLB is less than 10. The selected salt(s), solvent, and surfactant together are believed to promote dot gain and reduce feathering and pigment flotation, resulting in higher quality text prints. The composition of the pre-treatment fixing fluid disclosed herein also exhibits desirable pen reliability.

As mentioned above, the pre-treatment fixing fluid disclosed herein includes calcium propionate, calcium pantothenate, tetraethylene glycol, a low HLB surfactant, an acid, and a balance of water. In some examples, the pre-treatment fixing fluid consists of these components alone, and in other examples, the pre-treatment fixing fluid includes these components and an anti-microbial agent.

The combination of calcium propionate and calcium pantothenate provides the pre-treatment fixing fluid with metal salts that may flocculate anionic pigment in an ink deposited thereon, and that may control pigment migration/flotation etc. The calcium propionate may be present in an amount ranging from greater than 4.5 wt % to about 8.0 wt % based on the total wt % of the pre-treatment fluid. The calcium pantothenate may be present in an amount ranging from about 2.0 wt % to 15 wt % or less. In an example, the pre-treatment fixing fluid may include about 6.5 wt % of calcium propionate and about 4.8 wt % of calcium pantothenate. The amount of the metal salts is believed to be high enough to achieve the desired fixing effect without deleteriously affecting pen reliability.

The pre-treatment fixing fluid also includes tetraethylene glycol as a co-solvent. The tetraethylene glycol may be present in total in the pre-treatment fixing fluid in a range from about 0.1 wt % to about 30 wt %. The amount used may depend, at least in part, on the jetting architecture used to apply the pre-treatment fixing fluid. In an example, the amount of tetraethylene glycol used in about 12 wt %.

The pre-treatment fixing fluid also includes the low HLB surfactant. This type of surfactant is capable of dynamically controlling, in particular, lowering, the surface tension of the pre-treatment fixing fluid. The low HLB surfactant is believed to provide the pre-treatment fluid, at the time of its application, with a surface tension that is lower than the surface energy of the coated offset medium upon which the pre-treatment fixing fluid is being applied. As such, the contact angle between the pre-treatment fixing fluid and the medium is zero (0), which enables the pre-treatment fixing fluid to spread out across the medium surface in a horizontal direction (with respect to the medium surface), and effectively wet and reduce the surface energy of the offset coated medium.

One example of the low HLB surfactant is a self-emulsifiable wetting agent based on acetylenic diol chemistry (e.g., SURFYNOL® SE-F surfactant from Air Products and Chemicals, Inc.). The low HLB surfactant is present in the pre-treatment fixing fluid in an amount ranging from about 0.01 wt % to about 1.0 wt % based on the total wt % of the pre-treatment fixing fluid. In an example, the amount of the surfactant is about 0.05 wt %. It is believed that the desired surface tension may not be obtainable with other amounts and/or other surfactants.

In some examples, the pre-treatment fixing fluid may also include an antimicrobial agent. Antimicrobial agent(s), such as biocides and fungicides, may be added to inhibit the growth of harmful microorganisms. Example antimicrobial agents may include the NUOSEPT® (Ashland Inc.), UCAR-CIDE™ or KORDEK™ (Dow Chemical Co.), and PROXEL® (Arch Chemicals) series, and combinations thereof. A total amount of the antimicrobial agents in the pre-treatment fixing fluid may range from about 0.05 wt % to about 1 wt %. In an example, the pre-treatment fixing fluid includes about 0.1 wt % of a biocide.

The balance of the pre-treatment fixing fluid is water. In addition, buffer(s) may be used to adjust the pH of the pre-treatment fixing fluid to a particular pH. One example of a suitable buffer is methanesulfonic acid. In some examples, the buffer may be used in an amount sufficient to buffer the pH of the pre-treatment fixing fluid so that it ranges from 4.0 to 7.0. In an example, the pH of the pre-treatment fixing fluid is adjusted to about 6.6 using methanesulfonic acid.

An ink fixing system includes the pre-treatment fixing fluid disclosed herein and a coated offset medium. A coated offset medium is any paper coated to impart better image quality by providing some degree of surface gloss, smoothness, and reduced ink absorbency. Examples of commercially available coated offset media include STERLING® Ultra Gloss (NewPage Corp.) and UTOPIA™ Digital (Appleton Coated LLC).

As described above, the surface tension of the pre-treatment fixing fluid is lower than the surface energy of the offset coated medium so that when the pre-treatment fixing fluid is applied on the surface of the offset coated medium, the contact angle between the pre-treatment fixing fluid and the offset coated medium is 0. In an example, the surface tension of the pre-treatment fixing fluid is below 37 dyne/cm. In another example, the surface tension of the pre-treatment fixing fluid ranges from about 30 dyne/cm to about 33 dyne/cm. In still another example, the surface energy of the coated offset medium ranges from about 34 dyne/cm to about 42 dyne/cm, and the surface tension of the pre-treatment fixing fluid is about 33 dyne/cm or lower.

The pre-treatment fixing fluid may be applied onto the medium using any suitable high speed (e.g., from about 50 fpm to about 1000 fpm) inkjet printing apparatus, including thermal inkjet printers or web presses, piezoelectric inkjet printers or web presses, continuous inkjet printers or web presses.

In an example, the amount of pre-treatment fixing fluid that is applied to the medium ranging from about 1 gsm to about 7 gsm.

In the examples disclosed herein, no drying operation is performed after the pre-treatment fixing fluid is applied on the medium. Rather, while the pre-treatment fixing fluid is wet, the ink containing an anionically dispersed pigment is deposited on the pre-treatment fixing fluid on the medium. When multiple ink colors are used, it is to be understood that all of the inks are applied while previously deposited layers are still wet. The ink(s) is also formulated to be deposited by the inkjet printing system.

The salts present in the pre-treatment fixing fluid instantaneously react with the anionically dispersed pigment present in the ink, causing the pigment to crash out of ink and fixing the pigment on the medium surface. In addition, the applied pre-treatment fixing fluid provides the coated offset medium with a reduced surface energy, which causes the deposited ink(s) to spread less than if the surface energy were higher. This contributes to bleed control and dot gain, and thus enhances the print quality attributes. This benefit is in addition to the benefits obtained from the instantaneous fixing of the anionic pigment(s) in the ink by the salts in the pre-treatment fixing fluid.

It is believed that any ink including an anionically dispersed pigment may be used in conjunction with the coated offset medium and the pre-treatment fixing fluid disclosed herein. The ink may be any color, such as black, cyan, magenta, yellow, etc. The ink generally includes an ink vehicle and the anionically dispersed pigment.

As used herein, "ink vehicle" may refer to the liquid fluid in which colorant is placed to form the ink. A wide variety of ink vehicles may be used. The ink vehicles may include water alone or in combination with a mixture of a variety of different agents. Examples of these agents may include, but are limited to, co-solvents, surfactants, antimicrobial agents, viscosity modifiers, materials for pH adjustment, sequestering agents, preservatives, and the like.

The ink vehicle may include a co-solvent present in total in the ink in an amount ranging from about 0.1 wt % to about 30 wt %, depending on the jetting architecture. In an example, the co-solvent in present in the ink in an amount of about 6 wt % based on the total wt % of the ink. It is to be understood that other amounts outside of this example and range may also be used. Classes of co-solvents that can be used can include organic co-solvents, such as aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the ink vehicle may include 1-(2-hydroxyethyl)-2-pyrrolidone.

As mentioned above, the ink vehicle may also include surfactant(s) and/or antimicrobial agent(s). As an example, the ink may include non-ionic, cationic, and/or anionic surfactants, which may be present in an amount ranging from about 0.01 wt % to about 5 wt % based on the total wt % of the ink. In at least some examples, the ink vehicle may include a silicone-free alkoxylated alcohol surfactant such as, for example, TEGO® Wet 510 (Evonik Tego Chemie GmbH). Suitable antimicrobial agents include biocides and fungicides, including those previously described for use in the pre-treatment fixing fluid. In an example, the ink may include a total amount of antimicrobial agents that ranges from about 0.1 wt % to about 0.25 wt %.

In addition to the ink vehicle, the ink also includes the anionically dispersed pigment. In an example, the anionically dispersed pigment is in the form of a dispersion including water, the pigment, and an anionic polymer that disperses the pigment. The dispersion may also include, for example, a co-solvent, such as 2-pyrrolidone. The dispersion may be added to the other components of the ink vehicle to form the ink.

As used herein, "pigment" may generally include organic or inorganic pigment colorants, magnetic particles, aluminas, silicas, and/or other ceramics, organo-metallics, metallic particulates, or other opaque particles that introduce color to the ink vehicle. The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof.

Examples of suitable blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I.

Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48 (Ca), C.I. Pigment Red 48 (Mn), C.I. Pigment Red 57 (Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® R0100, STANDART® R0200, and DORADO® gold-bronze pigments (available from Eckart Effect Pigments, Wesel, Germany).

In the examples disclosed herein, the pigment is dispersed by the anionic polymer (i.e., dispersant). The dispersant may be present in an amount ranging from about 0.1 wt % to about 5 wt % of a total wt % of the ink.

In an example, the dispersant may be styrene-acrylic-type dispersants such as acrylic dispersants having i) hydrophilic monomers including acidic monomers, and ii) hydrophobic monomers. The acid number of the dispersant may range from about 120 mg/g to about 300 mg/g.

Acidic monomers that may be used in the acrylic dispersant may include, for example, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, vinyl benzoic acid, 2-acrylamido-2-methyl-1-propanesulfonic acid, and combinations thereof.

Examples of the hydrophobic monomers that can be polymerized in the acrylic dispersant may include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, and combinations thereof.

In an example, the anionically dispersed pigment does not have a phosphorus-containing group bound to its surface.

After the pre-treatment fixing fluid and ink(s) have been deposited, a drying operation may be performed. The drying operation(s) may be performed at ambient temperature or under heat. For example, the drying operation may be performed at about 80° C., or in some examples, at about 100° C., or in still further examples, at 80° C. and then at 100° C.

In some examples, post-treatment solutions (e.g., colorless binder-containing fluids) may be applied to the formed images in order to further enhance durability.

To further illustrate the present disclosure, an example is given herein. It is to be understood that this example is provided for illustrative purposes and is not to be construed as limiting the scope of the disclosed example(s).

EXAMPLE

Several pre-treatment fixing fluids (one example, PTF, and four comparative examples, CPTF 1-4) were prepared and printed to test pen reliability. The compositions are shown in Table 1 below.

TABLE 1

| Compositional Components | PTF (wt %) | CPTF1 (wt %) | CPTF2 (wt %) | CPTF3 (wt %) | CPTF4 (wt %) |
|---|---|---|---|---|---|
| Calcium Propionate | 6.5 | 8.38 | 3.0 | none | none |
| Calcium Pantothenate | 4.8 | none | 13.8 | 21.4 | 21.4 |
| Tetraethylene Glycol | 12 | 12 | 12 | 12 | 12 |
| SURFYNOL ® SE-F | 0.05 | 0.05 | 0.05 | 0.05 | 0.05 |
| Biocide | 0.2 | 0.06 | 0.2 | 0.2 | 0.2 |
| Methanesulfonic acid | Adjusted to pH 6.6 | Adjusted to pH 6.6 | Adjusted to pH 6.6 | Adjusted to pH 6.6 | Adjusted to pH 5.5 |
| Water | Balance | Balance | Balance | Balance | Balance |

The example and comparative pre-treatment fluids were printed with print testbeds simulating actual printing conditions within a system including ink usage, and the % drop volume, % drop weight, short term decap, and long term decap were tested.

Short and long term decap was performed on a testbed that included print cartridge electronics to print thermal inkjet pens. These pens were printed on a standard office paper. Pens were printed at discreet time intervals of about 1 second. Between each print time interval, the pen was kept idle and uncapped (1 second for short term decap and 3 days for long term decap). Short and long term decap are reported as # of spits (drops) required to attain a healthy (drop wt and location) normal drop on paper. The results are shown in Table 2.

TABLE 2

| Reliability | PTF (wt %) | CPTF1 (wt %) | CPTF2 (wt %) | CPTF3 (wt %) | CPTF4 (wt %) |
|---|---|---|---|---|---|
| % Drop Volume | −10 | −23 | 0 | −13 | −12 |
| % Drop Weight | −6 | −18 | −6 | −12 | −13 |
| Short Term Decap | 1 | 0 | 22 | 50 | 49 |
| Long Term Decap | 3 | 0 | 27 | 50 | 50 |

The short and long term decap results were not undesirably affected (i.e., they were close to 0) for PTF, and were a drastic improvement compared to CPTF2, CPTF3, and CPTF4. The % drop volume and % drop weight were much improved for PTF compared to CPTF1, which included no calcium pantothenate. Furthermore, the % drop weight was about two times better for PTF compared to CPTF3 and CPTF4. Overall, PTF exhibited the best pen reliability for all the pre-treatment fixing fluids that were tested.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from greater than 4.5 wt % to about 8.0 wt % should be interpreted to include not only the explicitly recited limits of greater than 4.5 wt % to about 8.0 wt %, but also to include individual values, such as 5.01 wt %, 7.25 wt %, 6.4 wt %, etc., and sub-ranges, such as from about 5.0 wt % to about 7.5 wt %, from about 6.0 wt % to about 6.5 wt %, etc. Furthermore, when "about" is utilized to describe a value, this is meant to encompass minor variations (up to +/− 10%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A pre-treatment fixing fluid for an offset coated medium, comprising:
   calcium propionate present in an amount ranging from greater than 4.5 wt % to 8.0 wt % based on a total wt % of the pre-treatment fixing fluid;
   calcium pantothenate present in an amount ranging from about 2.0 wt % to equal to or less than 15 wt % based on the total wt % of the pre-treatment fixing fluid;

tetraethylene glycol;
a surfactant having an HLB less than 10 present in an amount ranging from about 0.01 wt % to about 1.0 wt % based on the total wt % of the pre-treatment fixing fluid;
an acid present in an amount sufficient to render a pH of the pre-treatment fixing fluid from about 4.0 to about 7.0; and
a balance of water.

2. The pre-treatment fixing fluid as defined in claim 1 wherein the surfactant having the HLB less than 10 is a self-emulsifiable wetting agent based on acetylenic diol chemistry.

3. The pre-treatment fixing fluid as defined in claim 1, further comprising a biocide.

4. The pre-treatment fixing fluid as defined in claim 1 wherein the pH is about 6.6.

5. An ink fixing system, comprising:
an offset coated medium; and
a pre-treatment fixing fluid to be applied to a surface of the offset coated medium, the pre-treatment fixing fluid including:
calcium propionate present in an amount ranging from greater than 4.5 to about 8.0 wt % based on a total wt % of the pre-treatment fixing fluid;
calcium pantothenate present in an amount ranging from about 2.0 wt % to equal to or less than 15 wt % based on the total wt % of the pre-treatment fixing fluid;
tetraethylene glycol;
a surfactant having an HLB less than 10 present in an amount ranging from about 0.01 wt % to about 1.0 wt % based on the total wt % of the pre-treatment fixing fluid;
an acid present in an amount sufficient to render a pH of the pre-treatment fixing fluid from about 4.0 to about 7.0; and
a balance of water;
a dynamic surface tension of the pre-treatment fixing fluid being lower than a surface energy of the offset coated medium so that when the pre-treatment fixing fluid is applied on the surface of the offset coated medium a contact angle between the pre-treatment fixing fluid and the offset coated medium is 0.

6. The ink fixing system as defined in claim 5 wherein the surface energy of the offset coated medium ranges from about 34 dyne/cm to about 42 dyne/cm, and wherein the dynamic surface tension of the pre-treatment fixing fluid is about 33 dyne/cm or less.

7. The ink fixing system as defined in claim 5 wherein the surfactant having the HLB less than 10 is a self-emulsifiable wetting agent based on acetylenic diol chemistry.

8. The ink fixing system as defined in claim 5 wherein the pre-treatment fluid consists of the calcium propionate, the calcium pantothenate, tetraethylene glycol, the surfactant, the acid, optionally a biocide, and the balance of water.

9. A printing method, comprising:
depositing onto a coated offset medium, a pre-treatment fixing fluid including:
calcium propionate present in an amount ranging from greater than 4.5 to about 8.0 wt % based on a total wt % of the pre-treatment fixing fluid;
calcium pantothenate present in an amount ranging from about 2.0 wt % to equal to or less than 15 wt % based on the total wt % of the pre-treatment fixing fluid;
tetraethylene glycol;
a surfactant having an HLB less than 10 present in an amount ranging from about 0.01 wt % to about 1.0 wt % based on the total wt % of the pre-treatment fixing fluid;
an acid present in an amount sufficient to render a pH of the pre-treatment fixing fluid from about 4.0 to about 7.0; and
a balance of water; whereby the deposited pre-treatment fixing fluid spreads horizontally on the coated offset medium; and
while the pre-treatment fixing fluid is still wet on the medium, depositing an ink including an anionically dispersed pigment onto the pre-treatment fixing fluid.

10. The printing method as defined in claim 9 wherein when the pre-treatment fixing fluid is deposited on the offset coated medium, a contact angle between the pre-treatment fixing fluid and the offset coated medium is 0.

11. The printing method as defined in claim 9 wherein the anionic pigment does not have a phosphorus-containing group bound to a surface thereof.

12. The printing method as defined in claim 9 wherein no drying operation is performed between the depositing of the pre-treatment fixing fluid and the depositing of the ink.

13. The printing method as defined in claim 9, further comprising depositing a second ink onto the pre-treatment fixing fluid, the ink, or combinations thereof.

* * * * *